(12) United States Patent
Dennis et al.

(10) Patent No.: US 7,040,462 B2
(45) Date of Patent: May 9, 2006

(54) BALL RAMP CALIPER BRAKE

(75) Inventors: Brian P. Dennis, Kalamazoo, MI (US);
Howard H. Baldeosingh, St. Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 10/939,845

(22) Filed: Sep. 14, 2004

(65) Prior Publication Data

US 2006/0054429 A1  Mar. 16, 2006

(51) Int. Cl.
*B61H 13/00* (2006.01)

(52) U.S. Cl. ............... 188/59; 188/166; 188/72.2; 188/73.45

(58) Field of Classification Search ........... 188/72.9, 188/72.1, 72.7, 166, 167, 59, 28, 57, 71.9, 188/72.2, 73.43, 73.44, 73.45
See application file for complete search history.

(56) References Cited

U.S. PATENT DOCUMENTS

| | | | | |
|---|---|---|---|---|
| 3,266,602 A | * | 8/1966 | Fritz et al. | 188/71.9 |
| 3,743,060 A | * | 7/1973 | Hendrickson | 188/72.2 |
| 5,038,895 A | * | 8/1991 | Evans | 188/72.7 |
| 5,060,765 A | * | 10/1991 | Meyer | 188/71.9 |
| 5,101,939 A | * | 4/1992 | Sheridan | 188/59 |
| 5,219,048 A | * | 6/1993 | Shaw et al. | 188/72.1 |
| 5,647,459 A | * | 7/1997 | Buckley et al. | 188/72.9 |
| 6,250,438 B1 | * | 6/2001 | Chern | 188/72.7 |
| 6,374,958 B1 | * | 4/2002 | Usui et al. | 188/72.7 |

OTHER PUBLICATIONS

Brochure—Model MI15WM for 10 Inch Wheels, Hayes Brake LLC, Mequon, Wisconsin, 1 page (undated).
Drawing No. 32800 of Ausco Products, Inc., Benton Harbor, Michigan, 1 sheet (undated).
Drawing No. 75190 of Ausco Products, Inc., Benton Harbor, Michigan, 1 sheet (undated).
Drawing No. 31777 of Ausco Products, Inc., Benton Harbor, Michigan, 1 sheet (undated).
Drawing No. 26807 of Ausco Products, Inc., Benton Harbor, Michigan, 1 sheet (undated).

* cited by examiner

*Primary Examiner*—Melanie Torres
(74) *Attorney, Agent, or Firm*—Renner, Kenner, Greive, Bobak, Taylor & Weber

(57) ABSTRACT

A brake (10) for a wheel of a vehicle is slidably mounted to a vehicle frame by mounting sleeves (22). The brake (10) includes a stationary actuator (20) which has a plurality of depressions (38) adapted to receive a plurality of balls (40). The stationary actuator (20) further has a pin hole (34) which receives a pin (36) which correspondingly defines a pivot axis (50). Adjacent to the stationary actuator (20) is a rotating actuator (66) which rotates about an axis (50) and includes a plurality of depressions (78) which are axially aligned with the depressions (38) while in an un actuated state. The brake (10) is actuated by rotation of the rotating actuator (66) which correspondingly moves the balls (40) to progressively more shallow portions of the depressions (38, 78) which acts upon a washer (82) and one or more shims (86) to force a first stator (16) and a second stator (18) together and into contact with a rotor (12). The stators (16, 18) are biased apart by the bridge springs (90) and are axially located by a pair of bridge sleeves (30) such that the axes of the bridge sleeves (30) are coplanar with the axis (50).

22 Claims, 4 Drawing Sheets

BALL RAMP CALIPER BRAKE

TECHNICAL FIELD

This invention relates to a brake especially adapted for use with zero turn mowers and small utility vehicles, such as golf carts and the like. More specifically, this invention relates to such a brake wherein the actuating mechanism is a ball ramp having bridges located in the center of the geometric applied load.

BACKGROUND ART

Utility vehicles such as golf carts require small braking assemblies that provide adequate braking power with minimal input force. One such method for providing such a braking force is through the use of caliper disc braking assemblies that use ball ramp actuators. Typically, a ball ramp actuated brake includes several metal balls, sandwiched between a ramp plate and a stationary plate. The ramp and stationary plate include ramped depressions within which the balls reside. The balls are located in a circular pattern about a central pivot axis. If braking torque is desired, the operator causes the ramp plate to rotate about that axis, which moves the balls along the depression thus forcing the two plates apart. This force is transferred to a pair of brake pads on both sides of a rotating disc, causing them to apply pressure to the rotating disc which in turn creates brake torque.

Prior art ball ramp actuated brakes have numerous drawbacks. The bridge across the caliper that transfers the braking force to the brake pad is typically not at the geometric center of the braking force generated by the ball ramps. This causes a bending moment when braking force is applied. Because of the bending moment, the braking assembly must be much stronger and larger than would ordinarily be necessary. Also, the bending moment causes uneven wear of the pads and results in a lack in efficiency. In addition, not having the bridge at the geometric center of the braking force limits the methods of manufacture of the bridge. Additionally, the ramp and stationary plates of prior art ball ramp actuated brake assemblies are typically machined. This method of manufacturing is required because the ramp surface opposing the ball depressions must be flat in order to effectively transmit the braking force. This requirement eliminates the availability of less expensive manufacturing methods such as stamping or pressing.

In view of these problems, it is evident that the need exists for a ball ramp actuated braking assembly which provides greater efficiency, reduced bending moment, improved pad wear, all at a reduced manufacturing cost.

DISCLOSURE OF THE INVENTION

It is thus an object of the present invention to provide a brake assembly for a vehicle in which the braking force is applied without a bending moment.

It is another object of the present invention to provide a brake assembly, as above, which improves the wear on the brake pads.

It is a further object of the present invention to provide a brake assembly, as above, which is efficient and less costly to construct.

These and other objects of the present invention, as well as the advantages thereof over existing prior art forms, which will become apparent from the description to follow, are accomplished by the improvements hereinafter described and claimed.

In general, a brake assembly made in accordance with the present invention is adapted to engage the rotor of a wheel of a vehicle. The brake assembly includes a first stator and a second stator adapted to frictionally contact the rotor, a stationary actuator and a rotating actuator selectively rotatable about an axis. The stationary actuator and the rotating actuator are provided with depressions, with a plurality of balls being received between the depressions. A pair of bridge sleeves are positioned between the stationary actuator and the second stator. The first stator is moveable along the bridge sleeves upon actuation of said rotating actuator.

In accordance with another aspect of the present invention, the brake assembly for the wheel of a vehicle which has a rotor includes a first stator and a second stator adapted to frictionally contact the rotor. A stationary actuator has depressions for receiving a plurality of balls. A pin which defines an axis has one end received in the stationary actuator and the other end received in the first stator. A rotating actuator is selectively rotatable about the axis and has a first surface with depressions for receiving the balls, and a second surface opposed to the first surface. A washer is located proximate to the second surface of the rotating actuator and is rotatable about the axis. A plurality of shims are located proximate to the washer and are rotatable about the axis. Upon actuation of the rotating actuator, the washer rotates with the rotating actuator and the shims rotate relative to one another.

According to another feature of the present invention, a brake assembly for frictionally contacting a rotor includes a first stator and a second stator adapted to frictionally contact the rotor. A rotating actuator is selectively rotatable on an axis and has a first surface providing depressions for receiving a plurality of balls, and a second surface opposed to the first surface. A washer is positioned proximate to the second surface of the rotating actuator and is rotatable about the axis. A plurality of shims are positioned proximate to the washer and are rotatable about the axis such that upon actuation of the rotating actuator, the washer rotates with the rotating actuator and the shims rotate relative to each other. A pair of bridge sleeves are positioned between the stationary actuator and the second stator and have axes that are coplanar with the axis.

A preferred exemplary brake assembly made in accordance with the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 2:
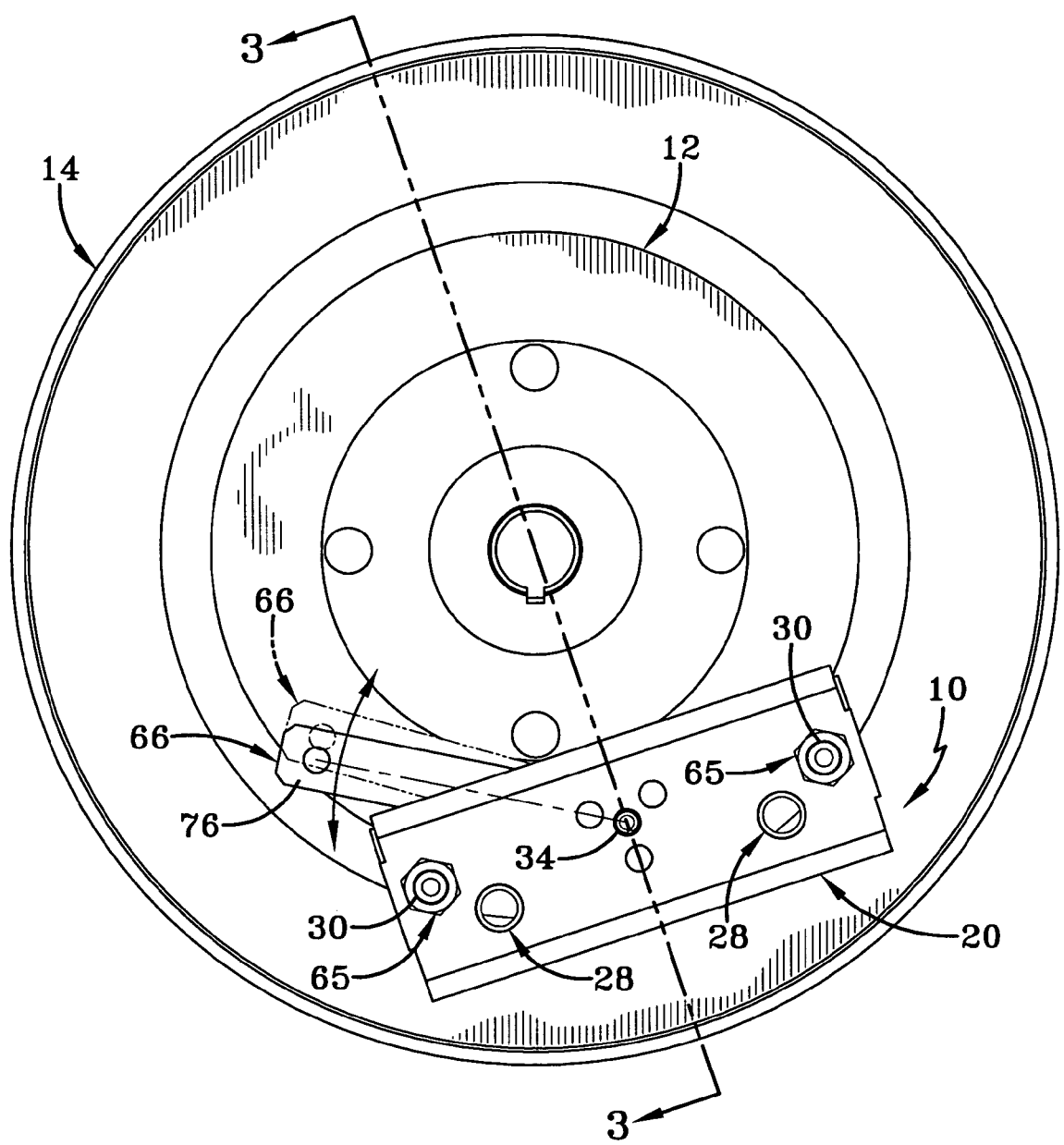
FIG. 2 is an elevational view of the brake assembly in FIG. 1.
Figure 3:
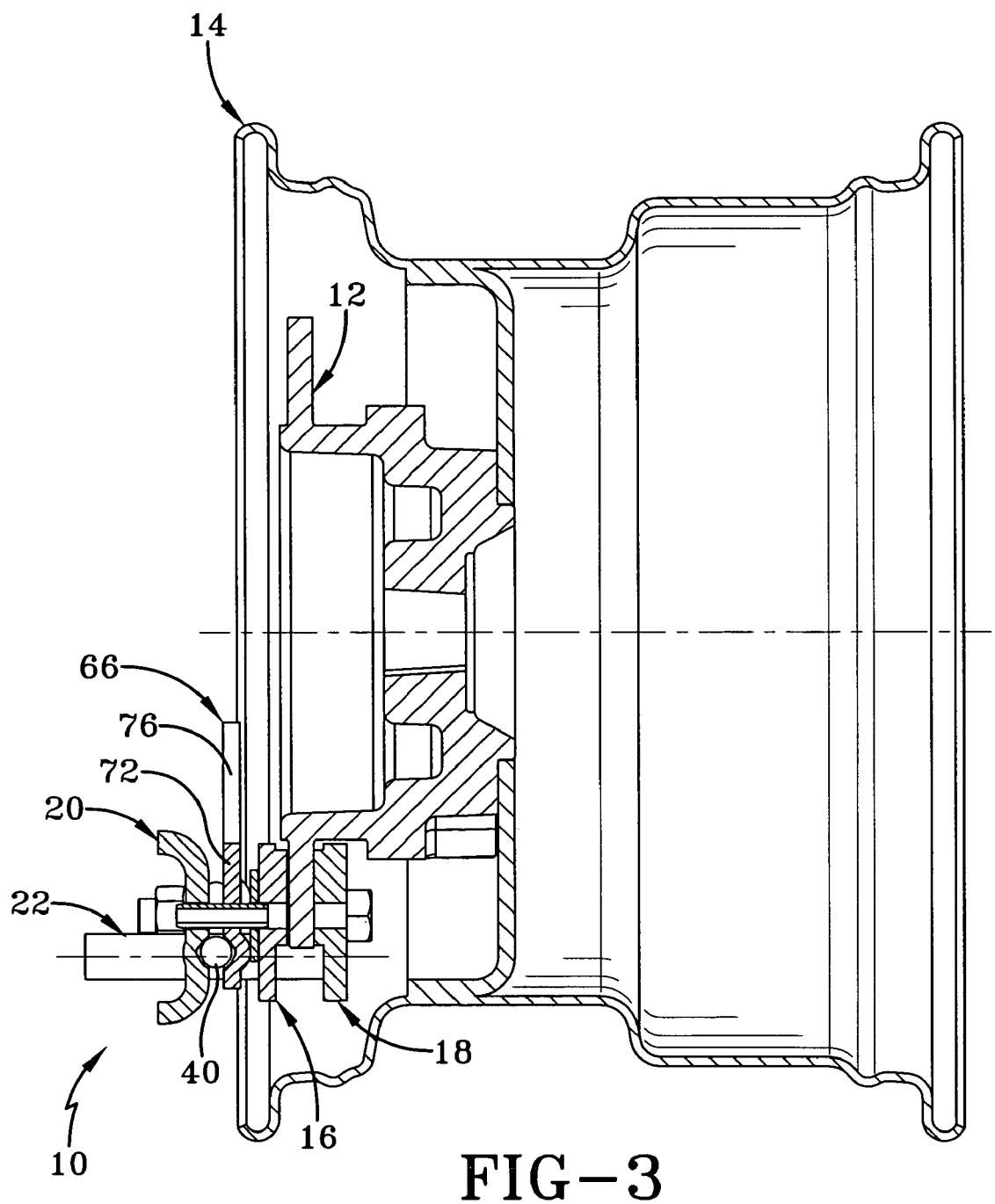
FIG. 3 is a sectional view taken substantially along line 3—3 of FIG. 2.

A brake assembly made in accordance with the present invention is indicated generally by the numeral 10. Referring to FIGS. 2 and 3, brake 10 is shown as being held at a constant radial position relative to a rotor 12 which is coupled to a wheel hub 14. When brake assembly 10 is actuated, a first stator 16 and a second stator 18, located on opposed sides of rotor 12, apply opposed coaxial pressure to the spinning rotor 12. Because brake assembly 10 is held rotationally stationary relative to rotor 12, torque is transferred from spinning rotor 12 to the vehicle frame (not shown), thereby braking the vehicle.

Figure 1:
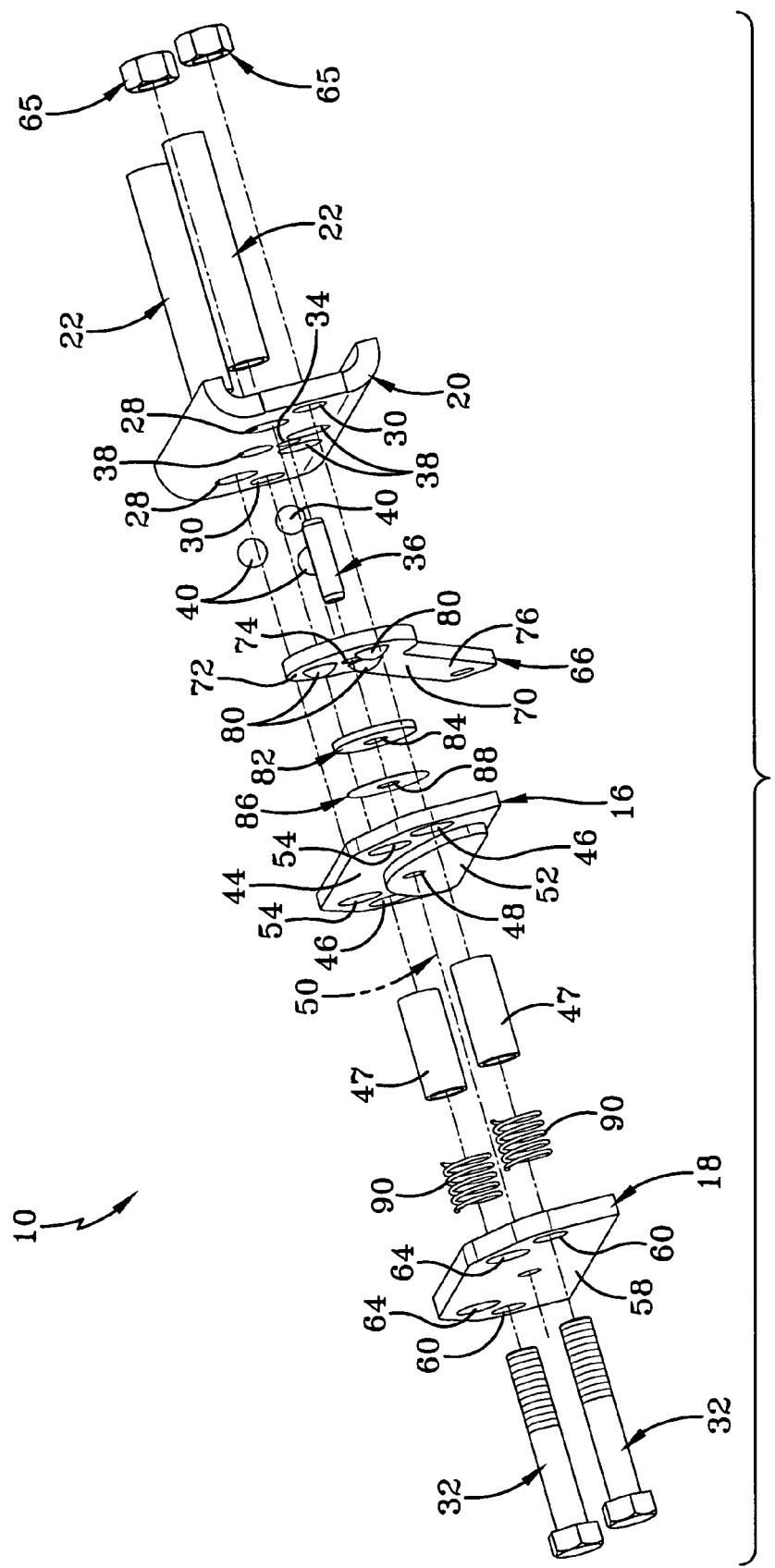
FIG. 1 is an exploded view showing the components of a brake made in accordance with the present invention
Figure 4:
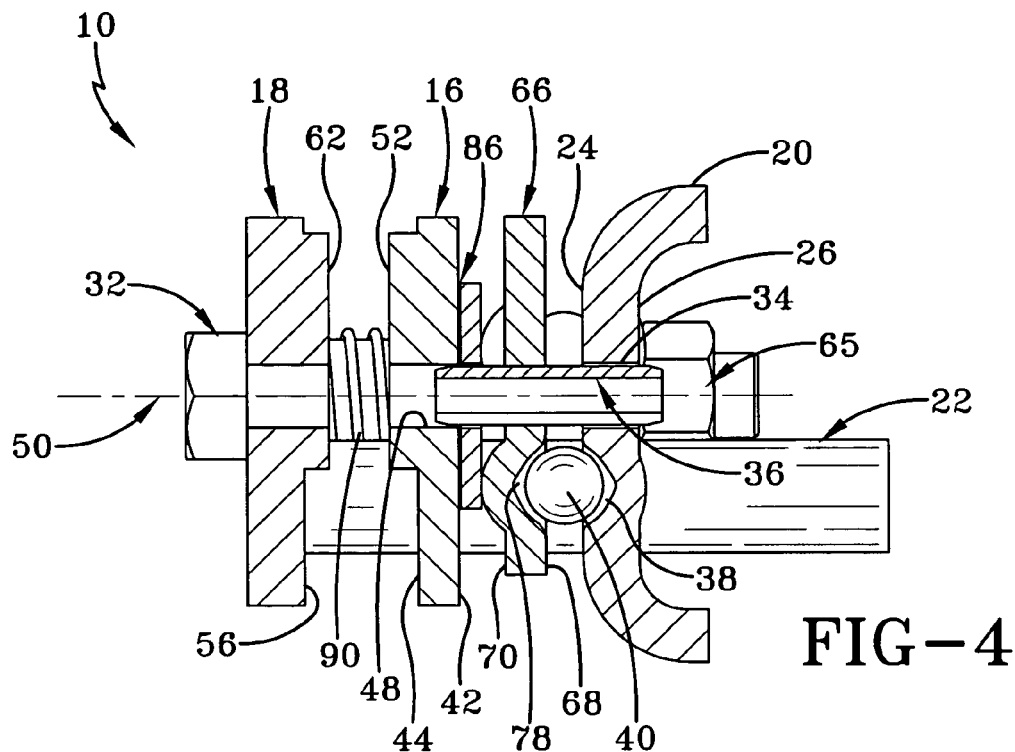
FIG. 4 is an enlarged sectional view of a portion of that which is shown in FIG. 2.
Figure 5:
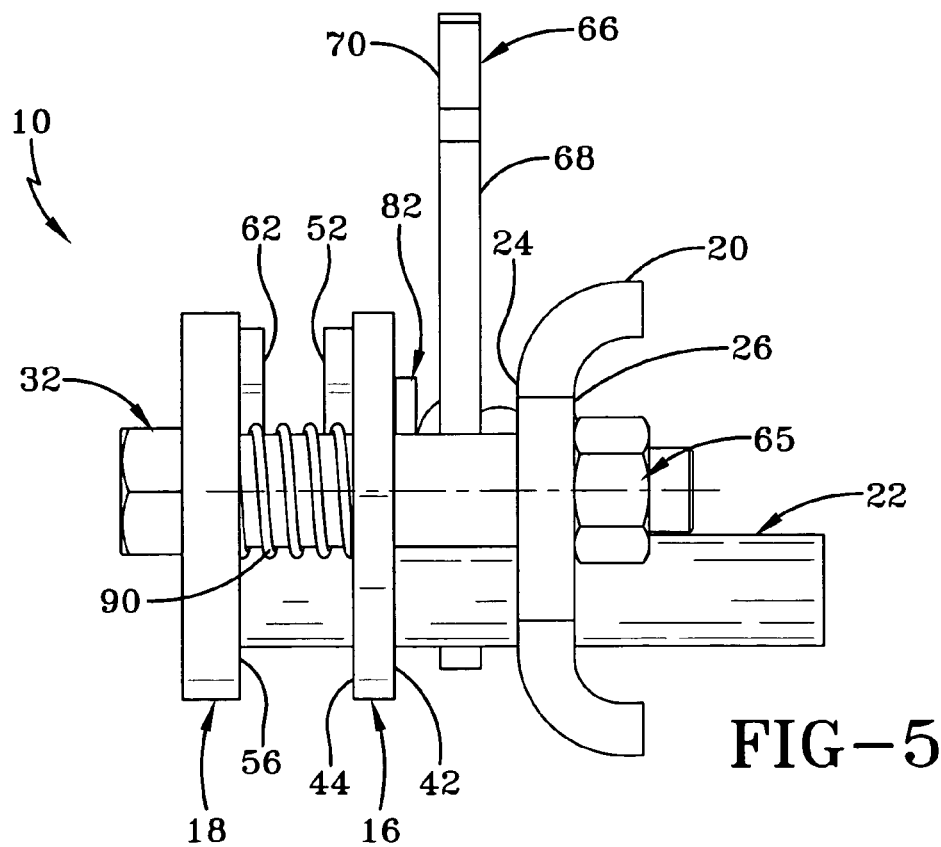
FIG. 5 is an enlarged side elevational view of the brake assembly.

Referring now to FIGS. 1 and 4, brake assembly 10 includes a stationary actuator 20 which is generally shaped in an elongated "C" and mounts to the vehicle frame via a pair of mounting sleeves 22, as will hereinafter be discussed in more detail. Actuator 20 has a first surface 24 facing rotor 12 and a second surface 26 facing the vehicle frame. Actuator 20 is provided with two holes 28 which are sized such that mounting sleeves 22 can be slidably received therethrough. Holes 28 are generally circular and are located on opposed ends of stationary actuator 20, adding stability and resistance to moment forces. As seen in FIG. 2, once mounted to a vehicle, holes 28, and thus sleeves 22, are radially exterior of rotor 12, which allows for the free rotation thereof.

Actuator 20 further includes a pair of bridge bolt holes 30 on opposed ends thereof, which are sized to receive the threaded portion of a bridge bolt 32. As seen in FIG. 2, once mounted to a vehicle, bolt holes 30, and thus bolts 32, are radially exterior to the rotor 12, which allows for the free rotation thereof.

Stationary actuator 20 is also provided with a pin hole 34, which is preferably located between bolt holes 30 at a point equidistant from bolt holes 30 on a coplanar line. In other words, pin hole 34 is preferably located on an axis which is coplanar with the axes defined by bolt holes 30 and equidistant from each. As will hereinafter be evident, this alignment is important to ensure minimal generation of moment forces about the pin hole axis. Pin hole 34 is sized to receive a slotted spring pin 36 which is a coiled tubular shaped piece of metal shaped like a cylinder with a small slot cut axially therethrough. Slotted spring pin 36 is radially compressed during installation, such that once assembled, the pin may exert a radial force in each of the holes in which it is received. This radial force ensures that pin 36 does not disassemble after assembly.

Stationary actuator 20 further includes three ball receiving depressions 38 formed in its first surface 24. Depressions 38 are positioned equidistant from pin hole 34 and are spaced approximately 120 degrees apart. Depressions 38 are generally quarter moon shaped, with the concave moon edge facing pin hole 34, and are deepest at their center with a gradually decreasing depth in the direction of each depression tip. In the preferred embodiment, the depth of depressions 38 at their deepest point is approximately ¼ of the diameter of each of a set of three balls 40 which are associated therewith. It should be appreciated that various depression shapes and depths might be used to accomplish the design objective. In addition, it is contemplated that more than three depressions/balls could be employed.

The first stator 16 of brake assembly 10 includes a first surface 42 facing stationary actuator 20 and a second surface 44 facing rotor 12. First stator 16 further includes a pair of bridge holes 46 which are sized such that a bridge sleeve 47 can be slidably received therein. Bridge holes 46 are located on opposed ends thereof and are axially aligned with bolt holes 30. First stator 16 is also provided with a pin hole 48 which is axially aligned with pin hole 34 of the stationary actuator 20, and is sized to receive slotted spring pin 36. As with the stationary actuator 20, pin hole 48 is preferably located on an axis which is coplanar with axes defined by bolt holes 30 and equidistant from each. Pin 36 defines an axis 50 about which actuating elements are rotated, as will hereinafter be discussed.

Adhered to second surface 44 is a brake pad 52 made of material with sufficient frictional and heat resistant properties to withstand repeated braking operations. Brake pad 52 is generally semicircular in shape and located equidistant from bridge holes 46. In the preferred embodiment, pad 52 is located such that the curved edge of pad 52 aligns with the radial edge of rotor 12.

First stator 16 further includes a pair of mounting sleeve holes 54, which are axially aligned with the holes 28 of stationary actuator 20. Mounting sleeve holes 54 are sized such that mounting sleeves 22 can be slidably received therein. Mounting sleeve holes 54 may be generally circular and are located on opposed ends of first stator 16, adding stability and resistance to moment forces.

The second stator 18 of brake assembly 10 includes a first surface 56 facing rotor 12 and a second surface 58 facing away from rotor 12. Second stator 18 further includes a pair of bridge holes 60 on opposed ends thereof, which are sized to receive bridge bolts 32. Bridge holes 60 are axially aligned with bolt holes 30 and bridge holes 46. Adhered to first surface 56 is a brake pad 62 made of material with sufficient frictional and heat resistant properties to withstand repeated braking operations. Brake pad 62 is preferably identical in shape as pad 52 and located equidistant from bridge holes 60. Pad 62 may be axially aligned with pad 52 such that during brake actuation, equal and opposed braking forces are applied to rotor 12. Pads 52 and 62 are the only surface of brake assembly 10 which contacts rotor 12.

Second stator 18 further includes a pair of mounting sleeve holes 64, which are axially aligned with the holes 28 of stationary actuator 20 and with holes 54 of first stator 16. Mounting sleeve holes 64 are sized such that mounting sleeves 22 can be slidably received therein. Mounting sleeve holes 64 may be generally circular and are located on opposed ends of stationary actuator 20, adding stability and resistance to moment forces.

Each bridge bolt 32 is sized to fit inside the hollow bore of bridge sleeves 47 with minimal radial clearance therein. The outer diameter of each bridge sleeve 47 is greater than the bridge bolt holes 30 located on stationary actuator 20 and bridge holes 60 located on second stator 18. When assembled, bridge sleeves 47 have opposed ends which rest on the first surface 24 of actuator 20 and first surface 56 of second stator 18. Bridge bolt 32 extends through the bores of bridge hole 60, bridge sleeve 47 and bridge hole 30 wherein the threaded end of bolts 32 receive nuts 65. Nuts 65 are tightened and securely rest against the second surface 26 of the stationary actuator 20. In this fashion, bridge sleeves 47 are secured between stationary actuator 20 and second stator 18 via bridge bolt 32 and thereby hold stationary actuator 20 and second stator 18 securely at a constant relative distance. Bridge sleeve 47 has a smooth outer surface, which allows first stator 16, to slide axially relative to stationary actuator 20 and second stator 18.

Brake assembly 10 further includes a rotating actuator 66 located between stationary actuator 20 and first stator 16. Rotating actuator 66 includes a first surface 68, facing actuator 20, and an opposed second surface 70 facing the rotor 12. Rotating actuator 66 further includes a generally circular body portion 72 having a pin hole 74 located centrally therein. Pin hole 74 receives pin 36 allowing rotating actuator 66 to rotate on pin 36 about axis 50. Rotating actuator 66 further includes an arm 76 which extends radially from the axis 50 and allows the user to apply a greater moment force about axis 50.

Referring particularly to FIG. 4, when in a non-actuated state, metal balls 40 (one depicted in FIG. 4) are secured between the lowest points of two sets of depressions, the aforementioned actuator depressions 38 and a set of depressions 78 located on the rotating actuator 66. Rotating actuator depressions 78 are substantially identical in shape, orientation and size as depressions 38 and are located on the first surface 68 of rotating actuator 66. In the non-actuated state, depressions 38 and 78 are axially aligned and balls 40 are positioned in the center of each depression. This non-actuated state corresponds to the smallest distance between stationary actuator 20 and rotating actuator 66.

Second surface 70 of rotating actuator 66 may include a set of detents 80, axially aligned with the depressions 78 of rotating actuator first surface 68. Detents 80 are raised bumps, and may be created during the stamping process used to fabricate depressions 78. The tips of detents 80 are adapted to contact a washer 82 located proximate to second surface 70.

Washer 82 is generally circular and includes a centrally located pin hole 84 which receives pin 36. Washer 82 may be made of a high friction material, which allows it to rotate with rotating actuator 66 during brake actuation. This design is preferable, as the detente points do not wear as they would if detents 80 slid over the washer surface. Additionally, the load is distributed evenly to a larger surface, adding to the life of the product. Finally, the inclusion of washer 82 allows rotating actuator depressions 78 to be stamped instead of machined, thereby decreasing the cost of manufacturing. Prior art rotating actuators required a flat surface facing the stator which in turn meant that the depressions had to be machined. Because the present design includes detents corresponding to the depressions on the opposed surface, the depressions may be created using a stamping method which simultaneously creates the depressions and detents.

Washer 82 is located between rotating actuator 66 and a set of shims 86 which are generally circular and include a centrally located pin hole 88 which receives pin 36 therethrough. One or more shims 86 may be included in order to facilitate the calibration of brake assembly 10. Shims 86 are located between washer 82 and first stator 16 thereby completing the load path between rotating actuator 66 and first stator 16. In addition, the shims 86 may be fabricated such that the friction between the shims 86 is low, thereby reducing the frictional losses, and resulting in higher mechanical efficiency. It also allows the relative rotational motion to be between the shims 86 and not between the rotating actuator 66 and the washer 82.

Brake assembly 10 further includes a pair of bridge springs 90 located on bridge sleeves 47 between first and second stators 16 and 18. Bridge springs 90 wrap around bridge sleeves 47 and, as assembled, bias first stator 16 away from second stator 18. This bias serves several purposes.

Primarily, the bias separates the stators while the brake assembly 10 is not actuated, thereby allowing free rotation of rotor 12. Further, springs 90 maintain balls 40 within depressions 38 and 78 by keeping constant pressure on the brake assembly. Since the balls 40 are kept under constant pressure in the depressions, free-play between the two actuators is eliminated, thus reducing the amount of rotating actuator travel needed to engage the brake.

Brake assembly 10 is mounted to the vehicle body via the two mounting sleeves 22, which may be hollow cylinders. Mounting sleeves 22 may be mounted to the vehicle body as, for example, by bolts. As installed, mounting sleeves 22 provide two smooth shafts projecting from the vehicle frame. Sleeves 22 are slidably located in holes 28 located on the stationary actuator 20, mounting sleeve holes 54 located on first stator 16 and mounting sleeve holes 64 located on second stator 18. This orientation allows the entire braking assembly to move axially along the mounting sleeves 22 while effectively transmitting radial forces to the vehicle body during braking. Primarily radial forces are generated while braking, that is, forces coplanar with the rotor disc face, and not axial forces, that is, forces parallel to hub rotational axis. The brake transmits these radial braking forces from the first stator 16 and second stator 18 to the vehicle via mounting sleeves 22. It should be appreciated that the brake assembly 10 may be mounted to the vehicle by means other than the mounting sleeves shown. For example, solid pins may be welded or threaded into the vehicle frame or a shoulder bolt may be used. The mounting means needs to be of sufficient strength to transfer braking loads and be the appropriate shape to allow the stators and stationary actuator to slide along its surface.

Actuation of the brake assembly 10 is achieved by rotating rotating actuator 66 about pivot axis 50. Rotation of rotating actuator may be performed directly by the operator as by pulling arm 76 by hand, or with an additional assembly, for example, a cable connected to a foot pedal. The rotation of rotating actuator 66 overcomes the bias of spring 90 and moves rotating actuator depressions 78 out of alignment with the corresponding actuator depressions 38. This in turn forces the balls 40 to role or move along the gradually decreasing depths of the two opposed depressions. This action correspondingly pushes rotating actuator 66 axially away from stationary actuator 20. The force from the balls 40 riding up the depressions 38 and 78, transmitted through the rotating actuator 66, washer 82, and shims 86, act to force first stator 16 away from stationary actuator 20 and towards engagement with rotor 12. The movement of first stator 16 away from stationary actuator 20 reduces the distance between stators 16 and 18 eventually causing first stator 16 to come into contact with spinning rotor 12 via brake pad 52. As the operator continues to rotate rotating actuator 66, stator 18 is drawn toward rotor 12 and the stators squeeze the rotor in a vise like fashion. Because brake assembly 10 is free to slide axially along mounting sleeves 22, the pressure applied by both brake pads is automatically equilibrated. Because the bridge sleeve axis is coplanar and equidistant with the axis of applied load 50, deflection of brake assembly 10 is reduced and negligible moment forces are generated. In as much as the bridge sleeves are coplanar and equidistant with the applied braking load, the brake pads wear more evenly and greater braking efficiency is achieved. Further, the present invention requires less structure because of the reduction of forces.

As should be evident from the foregoing disclosure, the present invention provides for improved braking efficiency, reliability and cost effectiveness. In view of the foregoing, it should thus be evident that a brake as described herein accomplishes the objects of the present invention and otherwise substantially improves the art.

What is claimed is:

1. A brake assembly for a wheel of a vehicle having a rotor comprising a first stator and a second stator adapted to frictionally contact the rotor, a plurality of balls, a stationary actuator having depressions for receiving said plurality of balls, a rotating actuator selectively rotatable about an axis, a washer, said rotating actuator having depressions on one surface for receiving said balls and having a set of detents located on a surface opposed to said one surface, said detents being adapted to contact said washer, and a pair of bridge sleeves positioned between said stationary actuator and said second stator, said first stator being moveable on said bridge sleeves upon actuation of said rotating actuator, said bridge sleeves having axes that are coplanar with said axis.

2. The brake assembly of claim 1 wherein said applied braking force is coaxial with the axis of said rotating actuator.

3. The brake assembly of claim 1 further comprising a shim, said washer including a first surface that contacts each said detente, and a second surface which contacts said shim, thereby converting point forces to a surface force.

4. The brake assembly of claim 3 wherein during rotation of said rotating actuator, said washer rotates with said rotating actuator.

5. The brake assembly of claim 1 further comprising a pair of bolts, each said bridge sleeve including a cylindrical hollow tube, said tubes receiving said bolts.

6. The brake assembly of claim 1 further comprising means to bias said first stator from said second stator.

7. The brake assembly of claim 6 wherein said means to bias also biases said rotating actuator axially towards said stationary actuator to thereby maintain said balls within said rotating and stationary actuator depressions.

8. The brake assembly of claim 1, the brake assembly being carried by a pair of shafts coupled to the vehicle, wherein said stationary actuator and said stators are provided with holes adapted to slidably receive the shafts.

9. The brake assembly of claim 1 further comprising a pin defining said axis, said rotating actuator, said washer and said shims having holes to receive said pin.

10. A brake assembly for a wheel of a vehicle having a rotor comprising a first stator and a second stator adapted to frictionally contact the rotor, a plurality of balls, a stationary actuator having depressions for receiving said plurality of balls, a rotating actuator selectively rotatable about an axis, said rotating actuator having depressions for receiving said balls, a washer located coaxially with said axis, a plurality of shims, said rotating actuator contacting said washer and said shims wherein said washer contacts one of said plurality of shims, said shims being made of a low friction material such that during rotation of said rotating actuator, said shims rotate relative to each other and said washer rotates with said rotating actuator, and a pair of bridge sleeves positioned between said stationary actuator and said second stator, said first stator being moveable on said bridge sleeves upon actuation of said rotating actuator, said bridge sleeves having axes that are coplanar with said axis.

11. A brake assembly for a wheel of a vehicle including a rotor comprising a first stator and a second stator adapted to frictionally contact the rotor; a plurality of balls; a stationary actuator having depressions for receiving said plurality of balls; a pin defining an axis, one end of said pin being rotationally received in said stationary actuator and the other end of said pin being received in said first stator; a rotating actuator selectively rotatable about said axis, said rotating actuator having a first surface having depressions for receiving said balls and a second surface opposed to said first surface; a washer located proximate to said second surface of said rotating actuator and rotatable about said axis; and a plurality of shims located proximate to said washer and rotatable about said axis, such that upon actuation of said rotating actuator, said washer rotates with said rotating actuator and said shims rotate relative to one another.

12. The brake assembly of claim 11 wherein a braking force is applied by said balls moving along said depressions during actuation of said rotating actuator, said braking force being coaxial with said axis.

13. The brake assembly of claim 11 further comprising a pair of bridge sleeves positioned between said stationary actuator and said second stator, said first stator being moveable on said bridge sleeves upon actuation of said rotating actuator, said bridge sleeves having axes that are coplanar with the applied braking force.

14. The brake assembly of claim 11 wherein said second surface of said rotating actuator includes a set of detents axially aligned with said depressions of said rotating actuator, said detents being adapted to contact said washer.

15. The brake assembly of claim 14 wherein said washer includes a first surface that contacts each said detente, and a second surface which contacts one of said shims, thereby converting point forces to a surface force.

16. The brake assembly of claim 13 further comprising a pair of bolts, said bridge sleeves each including a hollow cylindrical sleeve, one of said bolts being received inside each said sleeve.

17. The brake assembly of claim 13 further comprising means to bias said first stator from said second stator.

18. The brake assembly of claim 17 wherein said means to bias also biases said rotating actuator axially towards said stationary actuator to thereby maintain said balls within said rotating and stationary actuator depressions.

19. The brake assembly of claim 12, the brake assembly being carried by a pair of shafts coupled to the vehicle, wherein said stationary actuator and said stators are provided with holes adapted to receive the shafts.

20. A brake assembly for frictionally contacting a rotor comprising a first stator and a second stator adapted to frictionally contact the rotor, a plurality of balls, a stationary actuator having depressions for receiving said plurality of balls, a rotating actuator selectively rotatable about an axis, said rotating actuator having a first surface which provides depressions for receiving said balls and a second surface opposed to said first surface, a washer located proximate to said second surface of said rotating actuator and rotatable about said axis, a plurality of shims located proximate to said washer and rotatable about said axis such that upon actuation of said rotating actuator, said washer rotates with said rotating actuator and said shims rotate relative to each other, and a pair of bridge sleeves positioned between said stationary actuator and said second stator, said bridge sleeves having axes that are coplanar with said axis.

21. A brake assembly for a wheel of a vehicle having a rotor comprising a first stator and a second stator adapted to frictionally contact the rotor, a plurality of balls, a stationary actuator having depressions for receiving said plurality of balls, a rotating actuator selectively rotatable about an axis defined by a pin, said pin being positioned generally centrally of said rotating actuator, said rotating actuator having depressions for receiving said balls, and a pair of bridge sleeves positioned between said stationary actuator and said second stator, said first stator being moveable on said bridge sleeves upon actuation of said rotating actuator, said bridge sleeves having axes that are coplanar with said axis.

22. A brake assembly for a wheel of a vehicle having a rotor comprising a first stator and a second stator adapted to frictionally contact the rotor, a plurality of balls, a stationary actuator having depressions for receiving said plurality of balls, a rotating actuator selectively rotatable about an axis, said rotating actuator having depressions for receiving said balls, and a pair of bridge sleeves positioned directly between said stationary actuator and said second stator, said first stator being moveable on said bridge sleeves upon actuation of said rotating actuator, said bridge sleeves having axes that are coplanar with said axis.

* * * * *